(12) United States Patent
Azencott

(10) Patent No.: US 6,721,445 B1
(45) Date of Patent: Apr. 13, 2004

(54) METHOD FOR DETECTING ANOMALIES IN A SIGNAL

(75) Inventor: Robert Azencott, Paris (FR)

(73) Assignee: Miriad Technologies, Paris (FR)

( * ) Notice: Subject to any disclaimer, the term of this patent is extended or adjusted under 35 U.S.C. 154(b) by 0 days.

(21) Appl. No.: 09/519,597

(22) Filed: Mar. 6, 2000

(30) Foreign Application Priority Data

Jan. 31, 2000 (EP) ............................................ 00410009

(51) Int. Cl.$^7$ ................................................. G06K 9/62
(52) U.S. Cl. ...................... 382/160; 382/191; 382/207; 702/69; 702/77; 714/817
(58) Field of Search ................................ 382/141, 149, 382/157, 160, 191, 207, 208; 700/110; 702/69, 77; 714/817

(56) References Cited

U.S. PATENT DOCUMENTS 5,742,522 A    4/1998   Yazici et al. ............ 364/551.01

OTHER PUBLICATIONS

R.R. Schoen et al., An Unsupervised, On–Line System For Induction Motor Fault Detection Using Stator Current Monitoring, IEEE Industry Applications Society Annual Meeting, 1994, pp. 103–109, vol. 1.*

K.V. Mardia, J.T. Kent and J.M. Bibby, "Multivariate Analysis," Academic Press, pp. 1–25, 1979.

H. Bourlard and Y. Kamp, "Auto–Association by Multilayer Perceptrons and Singular Value Decomposition," Biological Cybernetics, No. 59, pp. 291–294, 1988.

C. Jutten and J. Herault, "Blind separation of sources, Part I: An adaptive algorithm based on neuromimetic architecture," Signal Processing 24, pp. 1–10, Jul. 1991.

Jean–François Cardoso, C.N.R.S. and E.N.S.T., "Blind signal separation: statistical principles," Proceedings of the IEEE, vol. 9, No. 10, pp. 2009–2025, Oct. 1998.

S. Mallat, "A Wavelet Tour of Signal Processing," Academic Press, 2nd Edition, pp. 1–19, Sep. 1999.

European Search Report dated Oct. 12, 2000.

"ILIAD: A Computer–Aided Diagnosis and Repair System", Chi W. Yau, 1987 International Test Conference, Paper 38.1, pp. 890–898.

"Multivariate Statistical Signal Processing Technique for Fault Detection and Diagnostics", B. R. Upadhyaya et al., ISA Transactions, vol. 29, No. 4, 1990, pp. 79–95.

* cited by examiner

Primary Examiner—Brian Werner
(74) Attorney, Agent, or Firm—McDermott, Will & Emery

(57) ABSTRACT

A method for detecting anomalies in a digitized complex signal analyzed by a detection unit, including a machine learning and a diagnosis of the intensity and/or the rarity of an anomaly, the learning including the steps of:
  1.1 selecting sequences of values of the signal;
  1.2 transforming the signal to extract therefrom characteristics of a type easily extracted by a human eye; and
  1.3 reducing number n of digital data by an automatic compression;

the diagnosis including the steps of:
  2.1 applying steps 1.1 to 1.3 to a polling window ($F_k$) likely to include an anomaly;
  2.2 comparing the obtained vector with a reference defined according to the same transformation and compression structure.

8 Claims, 2 Drawing Sheets

METHOD FOR DETECTING ANOMALIES IN A SIGNAL

BACKGROUND OF THE INVENTION

1. Field of the Invention

The present invention relates to a method for detecting anomalies in a digitized signal.

2. Discussion of the Related Art

In the context of industrial processings or during the operation of machines, it may be useful to monitor whether the operation flow is normal or abnormal. For example, in an industrial processing, several sensors will be placed at various points of a manufacturing line to store, for example, flow rates, pressures, temperatures . . . and follow their variations. In an automobile, a plane, a rocket, for example, sensors may be arranged on various propulsion elements or in the vicinity thereof to analyze operating characteristics thereof. Here again, the sensors may be sensors of the flow rate, temperature, pressure, speed, etc. Similarly, it may be desired to analyze the characteristics of a product under manufacturing, for example in the field of chemistry, pharmaceutics, agricultural-produce industry. The occurrence of possible structural anomalies in a building or a structure may also be monitored by vibration sensors. In all these cases, sensors will provide a continuous analysis of several manufacturing, operation, structure, or formulation parameters.

More generally, interest will be taken in detecting the presence of anomalies in any signal likely to fluctuate or in any computerized transmission of digitized data such as: passenger traffic, mobile telephony traffic indicators, etc.

In the state of the art, a known method for detecting anomalies in a signal consists of performing many preliminary tests, storing a large number of signals, analyzing the operation of the associated process, identifying signals including one or several anomalies corresponding to malfunctions of the process, and storing normal signals, which do not include these anomalies and correspond to a normal process operation. An iterative calculation based on an artificial neural network enables learning to discriminate a signal including anomalies from a normal signal. Abnormal signal phases can then be identified by using this experimental learning.

A major handicap of this method results from the fact that the implemented learning is very slow and requires performing a large number of tests and having a large number of examples of signals including the anomalies to be detected. Such a method can especially not be implemented to analyze anomalies and signals occurring relatively seldom, for example, to analyze the first instants characterizing the starting of a rocket or signals that only very exceptionally include anomalies, for example nuclear plant cooling circuit monitoring signals.

Another disadvantage of this method results from the fact that the calculation program of the neural network used will be specific to the analyzed signal and will not be applicable to detecting an anomaly on a signal of another nature. Thus, for each signal to be analyzed, a specific calculation program and a corresponding programming time will have to be provided.

SUMMARY OF THE INVENTION

An object of the present invention is to provide a method for detecting anomalies overcoming the disadvantages of prior art methods.

A more specific object of the present invention is to provide such a method that is applicable to detecting anomalies in signals for which no previous sample of anomaly is available.

Another object of the present invention is to provide such a method in which anomalies of a signal can be discovered by an automatic unsupervised learning, without using previous tests on possible malfunctions of the process with which the signal is associated, and without requiring for the user to provide example or lists of possible anomalies.

Another object of the present invention is to provide such a method in which an initial learning of signal characteristics can be performed by an unsupervised automatic parameterizing to then detect anomalies by a statistical analysis or by comparison with memorized types of anomalies.

The present invention applies to a continuous signal as well as to an oscillating signal. This signal may originate in real time from a sensor recording of a system variable (temperature, pressure, vibration, noise, spectrographic analysis signal, x-ray analysis signal . . . ). The signal may also be a signal recorded by such a sensor stored in a digital databank. It may also be other types of signals stored in a digital databank, for example, as indicated, a signal characterizing the evolution of a data sequence representing any information, the variations of which are desired to be analyzed, for example data resulting from statistical analyses, from passenger or vehicle traffic indicators, etc.

Generally, according to the present invention, complex geometric characteristics, in frequency or time, of an initial signal portion are statistically analyzed to enable subsequently recognizing an anomaly on any subsequent portion of the same signal. This subsequent portion of the same signal may correspond to a separate sequence of a signal of same type. For example, if the taking-off of a rocket has been analyzed, information gathered upon analysis of a first rocket may be used for each of the considered signals to set the initial analysis parameters of the taking-off of the next rocket.

More specifically, to achieve the above-mentioned objects, the present invention provides a method for detecting anomalies in a digitized complex signal analyzed by a detection unit, including a machine learning step including a parameterizing of an automatic compression system, and a step of diagnosis of the intensity and/or the rarity of an anomaly, the learning including the steps of:
1.1 selecting a succession of sequences of values of the analyzed signal corresponding to a succession of time windows ($F_k$);
1.2 transforming the signal of each of the windows to extract therefrom characteristics of a type easily extracted by a human eye to form a first vector ($D_k$) of dimension n; and
1.3 reducing number n of digital data by an automatic compression of the first vector ($D_k$) to provide a second vector with coordinates substantially independent in probabilistic terms, of dimension p smaller than n;

the diagnosis including the steps of:
2.1 applying steps 1.1 to 1.3 to a polling window ($F_k$) likely to include an anomaly;
2.2 comparing the obtained vector with a reference defined according to the same transformation and compression structure.

According to an embodiment of the present invention, the transformation intended for extracting signal characteristics associated with the human eye vision system is selected from the group including a fast Fourier transform (FFT), a transform on a Gabor-wavelet base, a maxima and/or minima extraction, and the like.

According to an embodiment of the present invention, the reference is an anomaly of predefined type of a signal such as a hump, a hiccup, a jolt, a trend change, a frequency shift or the like and an anomaly diagnosis signal is provided when there is a coincidence between the obtained vector and the reference.

According to an embodiment of the present invention, the reference results from a histogram of each coordinate of the second vector and an anomaly diagnosis is provided when a signal analyzed during a polling window deviates from said reference.

According to an embodiment of the present invention, applied to a digitized vibrating signal, the learning includes the steps of:
3.1 selecting a succession of sequences of values of the analyzed signal corresponding to a succession of time windows ($F_k$);
3.2 calculating, for each time window $F_k$, a first vector ($D_k$) of dimension n representing the spectral density of the analyzed signal; and
3.3 reducing number n of digital data by an automatic compression of the second vector ($D_k$) to obtain a third spectral density vector with independent coordinates ($ID_k$) and of dimension p smaller than n;

the diagnosis includes the steps of:
4.1 applying steps 3.1 to 3.3. to a polling window ($F_k$) likely to include an anomaly.

According to an embodiment of the present invention, the method further includes:
during the learning, the step of calculating, for j varying from 1 to p, the histogram $H_j$ of each coordinate of the third vectors ($ID_k$), calculating for each of these coordinates the probability $P_j(a)$ for this coordinate to be greater than a (if a is greater than the median of histogram $H_j$) or smaller than a (if a is smaller than the median of histogram $H_j$), and determining a function $Z_j(a)=-\log[P_j(a)]$, during the diagnosis, the steps of:
4.2 calculating the sum over j, $R=\Sigma Z_j(ID_{kj})$, for this polling window ($F_k$); and
4.3 comparing said sum (R) with an intensity or rarity threshold predefined by the user.

According to an embodiment of the present invention, the method further includes a step of smoothing the first vector ($D_k$) to define a second vector of smoothed spectral density ($LD_k$) and applying steps 3.2 and 3.3 to the vector ($LD_k$).

According to an embodiment of the present invention, the method further includes the steps of:
determining a spectral noise ($B_k=D_k-LD_k$);
calculating, for each spectral noise ($B_k$), an apse vector ($EXTR_k$), the coordinates of which are greater than a value $a*\sigma_k$, where a is a predetermined integer greater than 4 depending on the detection unit used and $\sigma_k$ is the standard deviation of the spectral noise ($B_k$); and
processing this vector like said second vector.

According to an embodiment of the present invention, applied to a digitized continuous signal,
the learning includes the steps of:
5.1 selecting a succession of sequences of n digital values of the analyzed signal corresponding to a succession of time windows ($F_k$), each sequence of n values defining a first vector ($S_k$) of dimension n;

5.2 smoothing, for example by sliding averages, the vector ($S_k$) to extract the points representing the non-linear tendency of the analyzed signal, which defines a second vector ($LS_k$);
5.3 calculating the scalar product of each second vector ($LS_k$) with a GABOR wavelet base, to associate with each polling window ($F_k$) a third vector ($RGS_k$) of GABOR coefficients of dimension smaller than that of the vector ($LS_k$);
5.4 reducing number n of digital data by an automatic compression of the third vector ($RGS_k$) to obtain a fourth vector with independent coordinates ($IRGV_k$) of dimension p smaller than n;

the diagnosis includes the steps of:
6.1 applying steps 5.1 to 5.4 to a polling window ($F_k$) likely to include an anomaly.

According to an embodiment of the present invention, the method further includes:
during the learning, the step of calculating, for j varying from 1 to p, the histogram $H_j$ of each coordinate of each fourth vector ($IRGV_k$), calculating for each of these coordinates ($IRGV_{kj}$) the probability $P_j(a)$ for this coordinate to be greater than a (if a is greater than the median of histogram $H_j$) or smaller than a (if a is smaller than the median of histogram $H_j$), and determining a function $Z_j(a)=-\log[P_j(a)]$, during the diagnosis, the steps of:
6.2 calculating the sum over j, $R=\Sigma Z_j(IRGV_{kj})$, for this polling window ($F_k$); and
6.3 comparing said sum (R) with an intensity or rarity threshold predefined by the user.

According to an embodiment of the present invention, the automatic compression is of the main component analysis compression type.

According to an embodiment of the present invention, the automatic compression is a compression by diabolo neural network compression.

According to an embodiment of the present invention, the automatic compression is a compression by extraction of independent components.

According to an embodiment of the present invention, the method is applied to vibration sensor signals.

The foregoing objects, features and advantages of the present invention will be discussed in detail in the following non-limiting description of specific embodiments in connection with the accompanying drawings.

DETAILED DESCRIPTION

According to the present invention, given a signal to be analyzed, this signal is digitized if it is not already digital. It is then sent to a detection unit essentially consisting of a properly programmed computer. According to the present invention, a signal portion selected by the user (for example an initial portion of the signal) is used to parameterize the program during a learning phase. The user can select the duration of this learning phase after which the anomaly search or diagnosis phase starts.

According to a feature of the present invention that will appear from the following discussion, the learning is an unsupervised machine learning during which specific frequency or time characteristics of the signal to be analyzed are determined. The user may also initially select a typology of searched anomalies, that is, a signal portion of specific shape (hump, hiccup, jolt, etc.) or of specific type (presence of unusual peaks, frequency shift, abrupt fluctuation, etc.). An anomaly may also or further be defined as an artifact occurring less than a given number of times within a time window, that is, with a predefined degree of rarity. It may also be chosen to only consider anomalies of duration greater than a predetermined threshold.

The present invention will be further detailed in the context of two specific examples of implementation.

1. Fourier Transform Processing of a Vibrating Signal

Figure 1A:
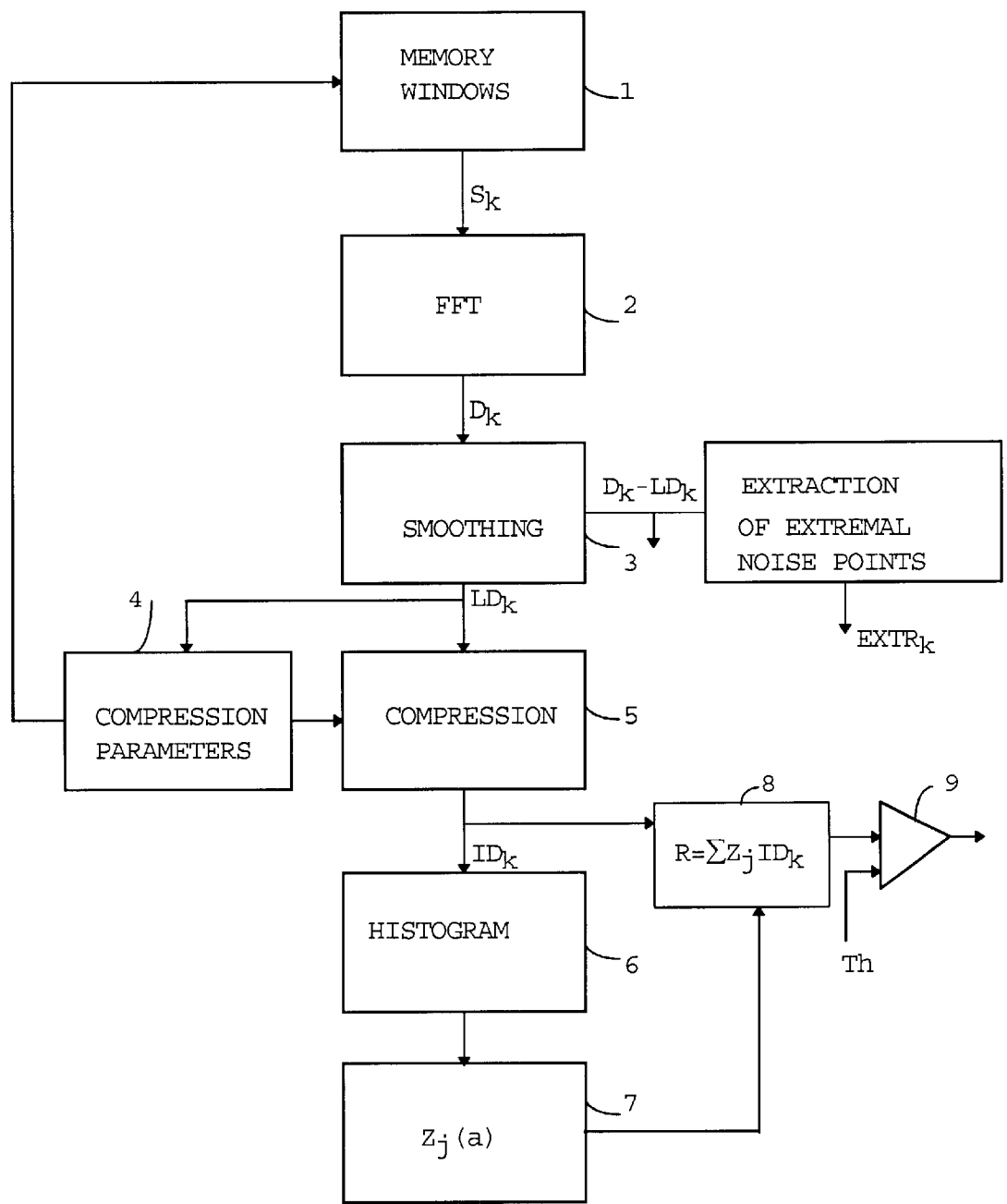
FIG. 1A shows a flowchart schematically illustrating the steps of the method according to the present invention applied to a vibrating signal.

FIG. 1A illustrates a first embodiment of the present invention applicable to vibrating signals with strong frequency components. The signal to be analyzed is initially sent to a memory 1 adapted to memorizing the signal for the duration of f polling windows of equal duration. Each window includes a sequence of digital values forming the coordinates of a vector $S_k$.

The signal is then passed to a fast Fourier transform (FFT) block 2 in which each sequence of digital values corresponding to a windows undergoes a FFT to define the spectral density of the portion of signal $S_k$ observed in window $F_k$. This spectral density is sampled to define a sequence of n digital values defining a spectral density vector $D_k$ of dimension n, this dimension n generally being different from the dimension of vector $S_k$. Number n depends on the sampling frequency that is chosen to achieve a compromise between the duration of the learning and the detection accuracy. After this step, which is repeated for f windows, an array $D=(D_1, D_2, \ldots D_k, \ldots D_f)$ with n lines and f columns is available.

A digital smoothing of vectors $D_k$ is optionally performed in a block 3, for example, by sliding averages, which provides a smoothed spectral density $LD_k$ and a spectral noise defined as $D_k-LD_k$. This noise may be analyzed in various conventional ways. Further, a calculation of the standard deviation of the spectral noise that can be used to extract all the extremal points of the noise, that is, all the coordinates of the noise vector having an absolute value greater than for example four time the standard deviation, will preferably be provided. These extremal noise points within a window $F_k$ altogether form a vector $EXTR_k$.

Given that the smoothing step is optional, it will be assumed that the following processing is applied to vectors $D_k$, but it could also be applied to smoothed vectors $LD_k$ and/or to vectors $EXTR_k$. In many practical cases, the analysis of vectors $EXTR_k$ will provide the user with more useful information than the analysis of vectors $D_k$ that will be described hereafter.

A program corresponding to a block 4 analyzes array D and determines the way in which this array can be compressed. Once this determination has been carried out, block 4 sends a message to memory block 1 and determines the parameterizing of a logic block or compression program 5 that transform vectors $D_k$ having n coordinates into vectors $ID_k$ having p coordinates, p being smaller than n. This compression step for example enables, in the case of the analysis of vibrating signals of a motor, passing from vectors $D_k$ having 1024 coordinates to compressed vectors $ID_k$ having less than 100 coordinates. This compression makes the learning according to the present invention reliably implementable in a reasonable time. Indeed, the amount of data required for the learning considered herein more than quadratically increases with the size of the vector used (with 1024 coordinates, a number; of observations on the order of $10^7$ would be required, whereas 50 to 100 coordinates make this amount fall to an order of $10^4$).

In a first alternative, the automatic compression is determined by a principal component analysis method, such as published in "Multivariate Analysis", by K. V. Mardia, J. T. Kent, and J. M. Bibby, Academia Press, 1979.

In a second alternative, the automatic compression is determined by an artificial neural network, of the triple-layer perceptron in diabolo architecture type. This compression method is published in "Auto-association by Multilayer Perceptrons and Singular Value Decomposition" by Bourlard H. and Kamp Y., Biological cybernetics, no. 59, pp. 291–294, 1988.

In a third alternative, the automatic compression is determined by a method of extraction of independent components published in "Blind separation of sources I. An adaptive algorithm based on neuromimetic architecture", by C. Jutten and J. Herault, Signal Processing, 24(1): 1–10, July 1991, and in "Blind signal separation: statistical principles", by Jean-Francois Cardoso, Proceedings of the IEEE, Vol. 9, no. 10, pp. 2009–2025, October 1998.

Such compression methods enable the iterative determination, based on vectors $D_1, D_2, \ldots D_k, \ldots D_f$, of a new base, of dimension p smaller than n, in which are defined new vectors with coordinates that are substantially independent in probabilistic terms, and thus not correlated, $ID_1, ID_2, \ldots ID_k \ldots ID_f$.

The process may continue according to one and/or the other of two alternatives.

According to a first alternative, the self-consistency of the analyzed signal is desired to be determined. For this purpose, the learning, the following step of which corresponds to block 6 and consists of forming the p histograms $H_j$ of the j-th coordinates $ID_{kj}$ of each vector $ID_k$ for j varying from 1 to p, is carried on.

At the next step, block 7, probability $P_j(a)$ for each j-th coordinate of vectors $D_k$ to be greater than a (if a is greater than the median of histogram $H_j$) or smaller than a (if a is smaller than the median of histogram $H_j$) is calculated. In other words, $P_j(a)$ is the frequency of occurrence of numerical values greater than number a for the j-th coordinate of vectors $D_k$, when index k scours all polling windows $F_k$. A function $Z_j(a)=-\log[P_j(a)]$ is then determined.

Once these operations have been performed, the actual learning period is over, and the process carries on with a diagnosis or anomaly detection phase, during which the FFT block, possibly the smoothing block, and the compression block, the parameters of which have been determined by the parameterizing phase and function $Z_j(a)$ determined during the learning phase, are used for the vector of each window. Thus, at the output of compression block 5, vector $ID_k$ is sent to a block 8 in which is calculated, for the considered polling window, the sum over j: $R=\Sigma Z_j(ID_{kj})$. A value or score is then obtained, which is sent to a comparator 9 in which this score is compared with a reference value Th corresponding to an intensity or rarity threshold predefined during an initial system set-up phase. An anomaly is indicated when sum R exceeds value Th.

Figure 1B:
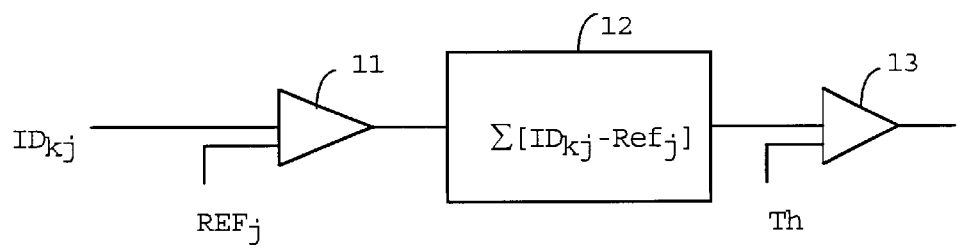
FIG. 1B illustrates an alternative of this method.

According to a second alternative, the automated statistical analysis performed in blocks 6 and 7 is omitted and each vector $ID_k$ is directly compared with specific noise signatures. More specifically, it will be attempted to determine the correlation between portions of signal $ID_k$ and portions of predetermined reference signals corresponding for example to specific frequency characteristics, such as frequency shifts, or specific frequency combinations. A comparison may also be effected with the Fourier transform of time signals that are desired to be identified. This approach is conceptually illustrated in FIG. 1B. Components $ID_{kj}$ of a vector $ID_k$ coming out of compression block S are compared with components $REF_j$ of a reference vector REF. The differences $ID_{kj}-REF_j$ are summed over j in a block 12 and the result is compared with a threshold Th in a block 13 that indicates whether vector $ID_k$ of polling window $F_k$ is very close or very distant from reference vector REF. Of course, this operation may be repeated for several predetermined reference vectors.

The present invention is likely to have various alternatives and modifications which will readily occur to those skilled in the art. More specifically, the programs intended, during the learning phase, for determining the optimal compression and function $Z_j$ may carry on during the diagnosis phase to improve the compression system parameterizing and the determination of the histograms and thus of function $Z_j$. Further, once a learning has been completed, a diagnosis may be performed immediately during the entire subsequent signal duration or only during some selected windows of this signal or of subsequent occurrences of this signal provided by a same system or by another theoretically identical system (a diagnosis can thus be repeated in a manufacturing line at chosen times, and even possibly on successive days while the system operation has been interrupted; it would however be desirable to periodically repeat the learning process to refine the measurements).

As appears from the preceding discussion, the main steps of the automatic learning phase according to the first embodiment of the present invention consist of:

dividing the input signal into windows of same duration, passing into the frequency field, determining an optimal signal compression, and comparing the window signals with reference signals resulting from histograms providing probabilities for various frequency components to exceed a threshold or with predetermined reference signals.

Various alternatives may be implemented for each of these functions. Especially, rather than passing into the frequency field, it may be passed into a coordinate system defined by Gabor wavelets, or other, as will be used for the processing of continuous signals discussed hereafter. Instead of the histogram determination, any system estimating threshold excess probabilities of various characteristics may generally be considered.

The above method may be used to detect undesirable sound signals. In this case, the detection unit compares the detected anomaly with a bank of undesirable sound sources.

2. Processing in a Gabor Wavelet System of a Continuous Signal

The present invention also provides, in the case where the signal to be analyzed is not an oscillating signal but a signal varying in a relatively continuous way, remaining in the time field. The process that will be described in relation with FIG. 2 can then be used for the learning.

Figure 2:
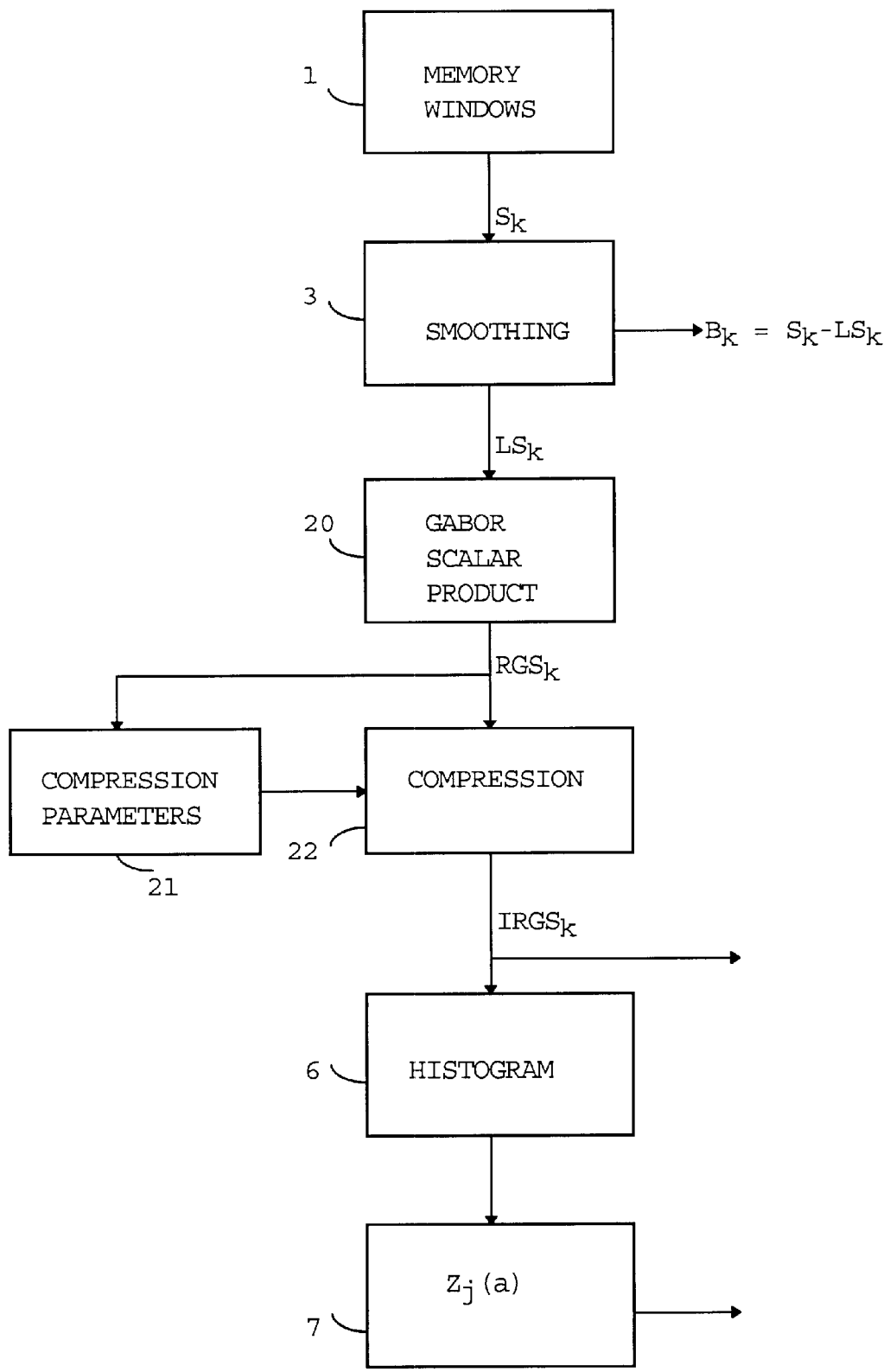
FIG. 2 shows a flowchart schematically illustrating the steps of the method according to the present invention applied to a continuous signal.

FIG. 2 only illustrates the flowchart of the learning phase. The same initial window definition step (1) is present, directly followed by the smoothing step (3), the smoothing being now necessary and no longer merely optional. More specifically, the smoothing step consists of smoothing, by an adequate digital filtering, the observed signal to extract therefrom the points representing the non-linear tendency of this signal. These points define a vector $LS_k$ of dimension n, n being the number of numerical values representing the observed signal in a polling window $F_k$. The value of this number depends on the desired accuracy and on the observed phenomenon.

The smoothing enables extracting, for each polling window $F_k$, a sequence of numerical values representing a noise signal $B_k=S_k-LS_k$ of dimension n. In an alternative embodiment, the extraction of noise $B_k$ is conventionally obtained by sliding average smoothing. The noise signal can provide various useful pieces of information.

Next step 20 consists of calculating the scalar product of each second vector $LS_k$ with a GABOR wavelet base (wavelet theory published in "A Wavelet tour of signal processing", Stéphane Mallat, second Edition, Academic Press, 1999). Thus, with each polling window $F_k$ is associated a third vector $RGS_k$, each coefficient of which corresponds to a coordinate linked to a GABOR wavelet. The user of the method will preferably have selected in an initial phase a precise set of GABOR wavelets $G_1, G_2, \ldots G_k, \ldots G_f$ enabling the best representation of the searched anomaly.

Once the signal has been defined in a GABOR wavelet space enabling the best representation of the anomaly, a compression is performed. At step 21, which is applied to vector $RGS_k$, compression parameters are calculated as previously and a compression block 22 that provides a compressed vector with p independent coordinates $IRGS_k$ is programmed.

Vector $IRGS_k$ is processed as in the context of the first embodiment. Otherwise, a histogram is calculated from which a function $Z_j(a)$ is deduced, after which, in the diagnosis phase, the sum over j, $R=\Sigma Z_j (IRGS_{kj})$, is compared with a threshold. Otherwise, the coordinates of vector $IRGS_k$ are compared with predetermined reference models.

According to an alternative embodiment of the method, applied to signals for which abrupt tendency changes or abrupt noise level changes are desired to be detected, instead of starting from vectors $S_k$, vector $W_k=S_{k+1}-S_k$ is calculated, $S_k$ being the vector of the data observed in a window $F_k$ and $S_{k+1}$ being the vector of the data observed in window $F_{k+1}$, and all the steps of FIG. 2 are applied to vector $W_k$. The anomaly detection is the detection of an abrupt tendency jump between two successive windows. This jump is detected by the calculation of the "score" of each polling window and the comparison of this score with a predefined reference threshold.

3. Generalized Definition of the Present Invention

It should be noted that the two previously-described specific embodiments of the present invention especially have the following common general features:

study of a signal divided into time windows;

no previous learning associated with experimental tests, but a direct parameterizing of an analysis program by an automated study of a signal portion (first instants, for example);

transformation chosen to extract characteristics of a type easily extracted by a human eye;

compression of the signal after or at the same time as the transformation, so that the parameterizing operations are not too long and that the signals during the diagnosis phase can then be directly processed.

As concerns the transformation, the following points should indeed be noted.

A Fourier transform computes frequency characteristics, for example, frequency variations, and those are characteristics to which a human eye is responsive at first glance when looking at a curve.

Gabor coordinates effectively correspond to curve elements recognizable at first sight. Indeed, the lower layers of the human cortex for processing retinal information contain neuron groups that automatically effect filterings analogous to scalar products with Gabor wavelets.

Other analogous transformations may be envisaged: for example, for a vibrating signal, the maxima, properly interpolated to form a smooth curve, form a useful vector descriptive of the signal, as well as the minima. A human eye is particularly responsive to modifications of these two curves.

Finally, each of the embodiments of the present invention enables either analyzing self-consistency features of the signal or comparing the signal with predetermined features in the transformation system used, which is particularly valuable since, as previously indicated, the transformations used rather well translate characteristics that can be extracted by the human eye at simple sight.

What is claimed is:

1. A method for detecting anomalies in a digitized complex signal analyzed by a detection unit, including a machine learning step including a parameterizing of an automatic compression system, and a step of diagnosis of the intensity and/or the rarity of an anomaly, the learning including the steps of:
   1.1 selecting a succession of sequences of values of the analyzed signal corresponding to a succession of time windows ($F_k$);
   1.2 transforming the signal of each of the windows to extract therefrom characteristics of a type able to be extracted by a human eye to form a first vector ($D_k$) of dimension n;
   1.3 reducing number n of digital data by an automatic compression of the first vector ($D_k$) to provide a second vector ($ID_k$) with coordinates substantially independent in probabilistic terms, of dimension p smaller than n;
   1.4 calculating, for j varying from 1 to p, a histogram $H_j$ of each coordinate of the second vectors ($ID_k$), calculating for each of these coordinates the probability $P_j(a)$ for this coordinate to be greater than a, if a is greater than the median of the histogram $H_j$, or smaller than a, if a is smaller than the median of the histogram $H_j$, and determining a function $Z_j(a)=-\log[P_j(a)]$, the diagnosis including the steps of:
   2.1 applying steps 1.1 to 1.3 to a polling window ($F_k$) likely to include an anomaly;
   2.2 calculating the sum over j for this polling window ($F_k$) so as to obtain a score of abnormality $R=\Sigma Z_j(ID_{kj})$; and
   2.3 comparing said sum (R) with an intensity or rarity threshold predefined by the user.

2. The method of claim 1, wherein the transformation intended for extracting signal characteristics associated with the human eye vision system is chosen from the group including a fast Fourier transform (FFT), a transform on a Gabor-wavelet base, and a maxima and/or minima extraction.

3. The method of claim 1, further including a step of smoothing the first vector ($D_k$) to define a third vector of smoothed spectral density ($LD_k$) and applying step 1.3 to the third vector ($LD_k$).

4. The method of claim 3, further including the steps of:
   determining a spectral noise ($B_k$) based on the first vector ($D_k$) and the third vector ($LD_k$), wherein the spectral noise is defined as $B_k=D_k-LD_k$;
   calculating, for each spectral noise ($B_k$), an a vector ($EXTR_k$), the coordinates of which are greater than a value $a*\sigma_k$, where a is a predetermined integer greater than 4 depending on the detection unit used and $\sigma_k$ is the standard deviation of the spectral noise ($B_k$).

5. The method of claim 1, wherein the automatic compression is a main component analysis compression type.

6. The method of claim 1, wherein the automatic compression is a compression by diabolo neural network compression.

7. The method of claim 1, wherein the automatic compression is a compression by extraction of independent components.

8. The method of claim 1, wherein the method is applied to vibration sensor signals.

* * * * *